(12) United States Patent
Beenau et al.

(10) Patent No.: US 8,126,449 B2
(45) Date of Patent: Feb. 28, 2012

(54) SERVICING ATTRIBUTES ON A MOBILE DEVICE

(75) Inventors: Blayn W Beenau, Peoria, AZ (US);
William J Gray, Peoria, AZ (US);
Jeffrey D Langus, New York, NY (US);
David P Whittington, Brighton (GB)

(73) Assignee: American Express Travel Related Services Company, Inc., New York, NY (US)

(*) Notice: Subject to any disclaimer, the term of this patent is extended or adjusted under 35 U.S.C. 154(b) by 667 days.

(21) Appl. No.: 12/270,473

(22) Filed: Nov. 13, 2008

(65) Prior Publication Data
US 2010/0120408 A1    May 13, 2010

(51) Int. Cl.
*H04M 3/00* (2006.01)
(52) U.S. Cl. ...................................................... 455/419
(58) Field of Classification Search .................. 455/418, 455/419, 556.1, 90.2, 412.1, 410, 405, 406, 455/407, 408, 413, 414.1, 414.2, 414.3, 414.4, 455/423, 425
See application file for complete search history.

(56) References Cited

U.S. PATENT DOCUMENTS

| | | | |
|---|---|---|---|
| 6,493,760 B1 | 12/2002 | Pendlebury et al. | |
| 7,076,255 B2 | 7/2006 | Parupudi et al. | |
| 7,107,276 B2 | 9/2006 | Johnson, Jr. | |
| 7,206,806 B2 | 4/2007 | Pineau | |
| 7,322,043 B2 | 1/2008 | Letsinger | |
| 7,379,920 B2 | 5/2008 | Leung et al. | |
| 7,419,428 B2 | 9/2008 | Rowe | |
| 7,424,303 B2 | 9/2008 | Al-Sarawi | |
| 7,424,512 B2 | 9/2008 | Dowling | |
| 7,424,732 B2 | 9/2008 | Matsumoto et al. | |
| 7,433,452 B2 | 10/2008 | Taylor et al. | |
| 7,434,723 B1 | 10/2008 | White et al. | |
| 7,437,331 B1 | 10/2008 | Rosenberger | |
| 2006/0026527 A1* | 2/2006 | Bells | 715/747 |
| 2008/0092182 A1* | 4/2008 | Conant | 725/109 |
| 2009/0325640 A1* | 12/2009 | Chava | 455/556.1 |
| 2009/0327885 A1* | 12/2009 | Aoki et al. | 715/700 |

* cited by examiner

*Primary Examiner* — Melody Mehrpour
(74) *Attorney, Agent, or Firm* — Snell & Wilmer L.L.P.

(57) ABSTRACT

Enabling remote customer service and maintenance using a visual identifier is disclosed. In response to a user enrolling in a service capability associated with a mobile device, the process utilizes a visual identifier to associate the service capability with the customer account, the service and the mobile device. The system allocates a visual identifier for each service capability and enables customer service agents to identify the service capability and mobile device, verify the user and retrieve information for the service interaction.

23 Claims, 4 Drawing Sheets

SERVICING ATTRIBUTES ON A MOBILE DEVICE

FIELD OF THE INVENTION

The present invention generally relates to improving the flexibility and efficiency of service capabilities on a mobile device, and more particularly, to using a visual identifier to enable servicing capabilities on a mobile device.

BACKGROUND OF THE INVENTION

Increased bandwidth, advances in device technology, increased popularity and other factors have caused the mobile device to be an important service delivery platform. Increasingly, e-commerce and other service interactions that were traditionally offered on personal computers are being deployed on mobile, wireless devices. The ability to offer innovative, secure and reliable service capabilities on a mobile device is a competitive advantage for many service providers.

Traditional mobile device software standards tend to focus on providing basic functionality (e.g. secure data storage and secure transaction execution). However, mobile device software standards do not typically provide an efficient and expedient method for a service provider (e.g., a transaction account issuer) to identify the service capabilities that are associated with a particular mobile device and to provide remote customer servicing functionality to the device. Thus, a long-felt need exists to enhance the process which enables a service provider to identify, cross-reference, track, install, maintain and upgrade services on a mobile device.

SUMMARY OF THE INVENTION

The present invention improves upon existing systems and methods by providing a tangible, integrated, customized and dynamic remote servicing process. In response to a user enrolling in a service capability that is at least partially or fully delivered or enabled on a mobile device, the system generates a visual identifier that associates the service capability with the mobile device. The visual identifier is stored as part of a profile by the service provider, and communicated to and stored on the mobile device. For instance, a user enrolls in an e-commerce service that is enabled by software on a mobile device. The e-commerce service provides financial transaction capabilities and uses secure storage and communication techniques to maintain the data associated with performing the financial transactions. However, it is neither desirable nor convenient to use financial transaction account data during customer service related activities. Hence, the visual identifier provides an expedient method for a service provider to coordinate servicing activities for a service installed on a mobile device.

In one embodiment, an enhanced method for providing remote servicing capabilities increases functionality and customer satisfaction associated with a service, while reducing the costs and security risks associated with the service. The system creates a visual identifier (VID) profile comprising a VID, a service identifier associated with a service and a mobile device identifier associated with a mobile device. The service is associated with the mobile device and the VID profile is stored in a VID database. The VID is transmitted to the mobile device and the mobile device stores the VID and is capable of displaying the VID. The system communicates with the mobile device based upon the VID.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
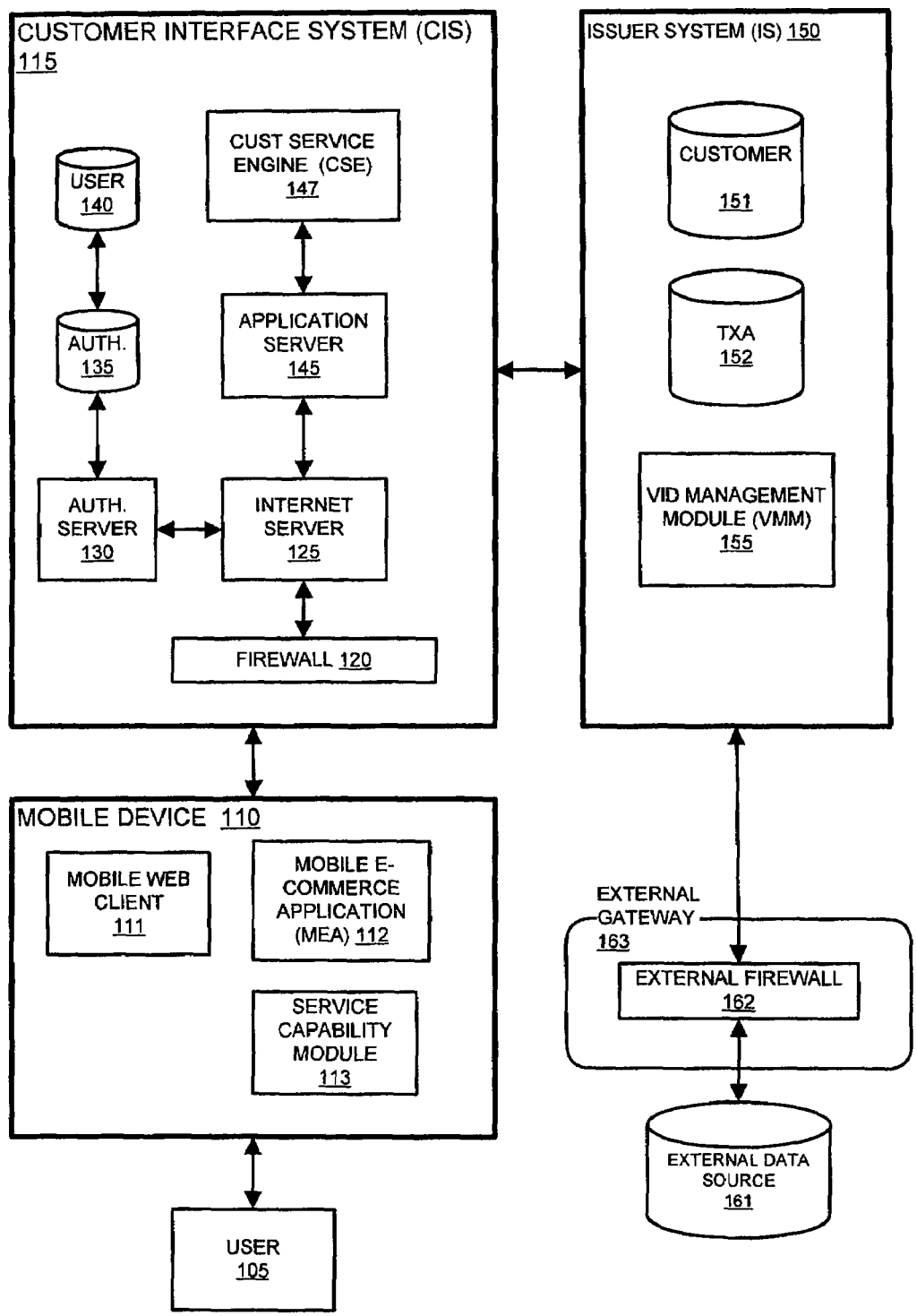
FIG. 1 is an overview of a representative system for providing remote servicing, in accordance with one embodiment of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a graphical user interface (GUI), a software module, logic engines, numerous databases and computer networks. While the system may contemplate upgrades or reconfigurations of existing processing systems, changes to existing databases and business information system tools are not necessarily required by the present invention.

The benefits provided by this invention include, for example, enhanced customer service capabilities, increased customer satisfaction and increased transaction account ("TXA") spending. For TXA payment processors, benefits include, for example, the ability to provide automated servicing capabilities, reduce costs, increase visibility into customer service and service partner interactions, and enhanced customer satisfaction with the products and services associated with a TXA. Benefits to users include, for example, increased convenience and security in association with receiving customer service interactions with a TXA issuer. Benefits to service partners include, for example, increased ability to track service utilization and apportion benefits and payments associated with the service.

While described in the context of systems and methods that enable enhanced automation, security and functionality for servicing TXA services, practitioners will appreciate that the present invention may be similarly used to enhance functionality, improve customer satisfaction and increase efficiency in the context of providing servicing capabilities for other products and in various industries. Other embodiments of such enhanced remote servicing capabilities may be accomplished through a variety of computing resources and hardware infrastructures.

While the description references specific technologies, system architectures and data management techniques, practitioners will appreciate that this description is but one embodiment and that other devices and/or methods may be implemented without departing from the scope of the invention. Similarly, while the description references a mobile device, practitioners will appreciate that other examples of providing remote servicing capabilities may be accomplished by using a variety of user interfaces including personal computers, kiosks and handheld devices such as personal digital assistants.

"Entity" may include any individual, consumer, customer, group, business, organization, government entity, transaction account issuer or processor (e.g., credit, charge, etc), merchant, consortium of merchants, account holder, charitable organization, software, hardware, and/or any other entity.

An "account", "account number" or "customer account" as used herein, may include any device, code (e.g., one or more of an authorization/access code, personal identification number ("PIN"), user profile, demographic, Internet code, other identification code, and/or the like), number, letter, symbol, digital certificate, smart chip, digital signal, analog signal, biometric or other identifier/indicia suitably configured to allow the consumer to access, interact with, be identified by or communicate with the system. The account number may optionally be located on or associated with a rewards card, charge card, credit card, debit card, prepaid card, telephone card, secure hardware area or software element associated with a phone or mobile device, embossed card, smart card, magnetic stripe card, bar code card, transponder, radio frequency card or an associated account. The system may include or interface with any of the foregoing cards or devices, or a fob having a transponder and radio frequency identifier ("RFID") reader in radio frequency ("RF") communication with the fob. Although the system may include a fob embodiment, the invention is not to be so limited. Indeed, the system may include any device having a transponder which is configured to communicate with an RFID reader via RF communication. Typical devices may include, for example, a key ring, tag, card, cell phone, wristwatch or any such form capable of being presented for interrogation. Moreover, the system, computing unit or device discussed herein may include a "pervasive computing device", which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen-digit number. The intermediary eight-to-eleven digits are used to uniquely identify the customer. A merchant account number may be, for example, any number or alpha-numeric characters that identify a particular merchant for purposes of card acceptance, account reconciliation, reporting, or the like.

A "transaction account" ("TXA") includes any account that may be used to facilitate a transaction, e.g. financial, loyalty points, rewards program, access, exchange, etc. A "TXA issuer" includes any entity that offers TXA services to customers.

A "TXA issuer" may include any entity which processes transactions, issues accounts, acquires financial information, settles accounts, conducts dispute resolution regarding accounts, and/or the like.

A "customer" includes any entity that has a TXA with a TXA issuer.

A "merchant" includes any entity that accepts a TXA account for payment and/or seeks payment, pays or settles financial transactions with a TXA issuer.

A visual identifier ("VID") includes an account number. In one embodiment, a VID is used to associate a customer with a service capability and/or a mobile web client.

"TXA identification data" ("TXA-ID") includes data used to identify, coordinate, verify or authorize a customer. The TXA-ID may also provide unique identification, validation and/or unique authorization. The TXA-ID may include, for example, an account number, code, authorization code, validation code, access code, transaction account identification number, demographic data, encryption key, proxy account number, PIN, Internet code, card identification number ("CID"), number, letter, symbol, digital certificate, smart chip, digital signal, analog signal, RFID, biometric or other identifier/indicia suitably configured to uniquely identify a customer and associated TXA and/or to authorize a transaction to a TXA. A CID is used in many credit or charge card transaction accounts. For further information regarding CIDs see, for example: Systems and Methods for Authorizing a Transaction Card, U.S. Pat. No. 6,182,894 issued on Feb. 5, 2001; and System and Method for Facilitating a Financial Transaction with a Dynamically Generated Identifier, U.S. Ser. No. 11/847,088 filed on Aug. 29, 2007, both of which are hereby incorporated by reference.

A "user" may include any individual or entity that interacts with a system or participates in a process. With reference to FIG. 1, User 105 may perform tasks such as requesting, retrieving, receiving, updating, analyzing, entering and/or modifying data. User 105 may be, for example, a consumer purchasing items from a merchant's online e-commerce site. User 105 may interface with Internet server 125 via any communication protocol, device or method discussed herein, known in the art, or later developed. In one embodiment, user 105 may interact with CIS 115 via a mobile web client 111 (e.g. an internet browser) at mobile device 110.

In one embodiment, with reference to FIG. 1, the system includes a user 105 interfacing with a customer interface system ("CIS") 115 by way of a mobile device 110. Mobile device 110 comprises any hardware and/or software suitably configured to facilitate communicating, processing, requesting, retrieving, updating, analyzing, entering and/or modifying data. Such software and hardware components may include mobile web client 111, mobile e-commerce application ("MEA") 112 and service capability module 113. The data may include verification data, authentication data, service enrollment data, service maintenance data, transaction data or any other information. Mobile device 110 includes any device (e.g., mobile phone), which communicates (in any manner discussed herein) with the CIS 115 via any network discussed herein. Mobile web client includes Internet browsing software installed within a computing unit or system to conduct online transactions and communications. These computing units or systems may take the form of personal computers, mobile phones, personal digital assistants, mobile email devices, laptops, notebooks, hand held computers, portable computers, kiosks, and/or the like. Practitioners will appreciate that the mobile device 110 may or may not be in direct contact with the CIS 115. For example, the mobile device 110 may access the services of the CIS 115 through another server, which may have a direct or indirect connection to Internet server 125.

MEA 112 includes any software module, configuration file or software component installed or enabled on mobile device 110.

Service capability module 113 includes any software module, configuration file, parameter, or software component installed or enabled on mobile device 110. In one embodiment, service capability module 113 is included in MEA 112.

The systems and methods contemplate uses in association with e-commerce, mobile e-commerce, TXA services, customer service systems, customer portals, payment systems, pervasive and individualized solutions, open source, biometrics, mobility and wireless solutions, commodity computing, grid computing and/or mesh computing. For example, in an embodiment, the mobile device 110 is configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The user 105 may communicate with the CIS 115 through a firewall 120 to help ensure the integrity of the CIS 115 components. Internet server 125 may include any hardware and/or software suitably configured to facilitate communications between the mobile device 110 and one or more CIS 115 components.

Authentication server 130 may include any hardware and/or software suitably configured to receive authentication credentials, encrypt and decrypt credentials, authenticate credentials, and/or grant access rights according to pre-defined privileges attached to the credentials. Authentication server 130 may grant varying degrees of application and data level access to users based on information stored within the authentication database 135 and the user database 140.

Application server 145 may include any hardware and/or software suitably configured to serve applications and data to a connected mobile device 110. The customer service engine ("CSE") 147 is configured to perform customer servicing functions such as enrolling in a new service, receiving a customer service request, sending a customer service update, installing software, performing account maintenance, etc. These functions include, for example, submitting customer TXA information to issuer system ("IS") 150, prompting user 105 with security challenges, verifying user responses, authenticating the user, initiating a service enrollment process, initiating other business modules, encrypting and decrypting. Additionally, CSE 147 may include any hardware and/or software suitably configured to receive requests from the mobile device 110 via Internet server 125 and the application server 145. CSE 147 is further configured to process requests, execute transactions, construct database queries, and/or execute queries against databases within system 100, external data sources and temporary databases, as well as exchange data with other application modules (not pictured). In one embodiment, the CSE 147 may be configured to interact with other system 100 components to perform complex calculations, retrieve additional data, format data into reports, create representations of data (e.g. extensible markup language ("XML")), construct markup language documents, and/or the like. Moreover, the CSE 147 may reside as a standalone system or may be incorporated with the application server 145 or any other CIS 115 component as program code.

IS 150 represents systems employed by transaction card companies like American Express® and other card acquirers or card issuers to authorize merchant transaction requests, manage transaction accounts and customer data and provide enhanced service capabilities.

Customer database 151 includes customer (i.e. user 105 who owns a TXA issued by a TXA issuer) contractual and demographic data.

TXA database 152 includes transaction data (e.g. for transactions charged to a TXA).

VID management module (VMM) 155 includes functionality to generate and maintain and manage VIDs.

CIS 115 and/or IS 150 may be interconnected via a payment network (not depicted in FIG. 1). The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network. While an exemplary embodiment of the invention is described in association with a transaction system and a customer service network, the invention contemplates any type of networks or transaction systems, including, for example, unsecure networks, public networks, wireless networks, closed networks, open networks, intranets, extranets, and/or the like.

FIG. 1 depicts databases that are included in an exemplary embodiment of the invention. A representative list of various databases used herein includes: an authentication database 135, a user database 140, a customer database 151, a TXA database 152, an external data source 161 and/or other databases that aid in the functioning of the system. As practitioners will appreciate, while depicted as separate and/or independent entities for the purposes of illustration, databases residing within system 100 may represent multiple hardware, software, database, data structure and networking components.

Authentication database 135 may store information used in the authentication process such as, for example, user identifiers, passwords, access privileges, user preferences, user statistics, and the like. The user database 140 maintains user information and credentials for CIS 115 users. As practitioners will appreciate, embodiments are not limited to the exemplary databases described above, nor do embodiments necessarily utilize each of the disclosed exemplary databases.

In addition to the components described above, system 100, CIS 115 and IS 150 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more system 100 components may be embodied as a customization of an existing system, an add-on product, upgraded software, a standalone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Mobile device 110 includes an operating system (e.g., Windows Mobile OS, Windows CE, Palm OS, Symbian OS, Blackberry OS, J2ME, Window XP, Windows NT, 95/98/2000, XP, Vista, OS2, UNIX, Linux, Solaris, MacOS, etc.) as well as various conventional support software and drivers typically associated with mobile devices and/or computers. Mobile device 110 can be in any environment with access to any network. In an embodiment, access is through a network or the Internet through a commercially available web-browser software package. Mobile device 110 may be independently, separately or collectively suitably coupled to the network via data links which includes, for example, a connection to an Internet Service Provider (ISP) over the local loop as is typically used in connection with standard wireless communications networks and/or methods, modem communication, cable modem, Dish networks, ISDN, Digital Subscriber Line (DSL), see, e.g., Gilbert Held, Understanding Data Communications (1996), which is hereby incorporated by reference. In another embodiment, any portion of mobile device 110 is partially or fully connected to a network using a wired ("hard wire") connection. As those skilled in the art will appreciate, mobile device 110 and/or any of the system components may include wired and/or wireless portions.

Firewall 120, as used herein, may comprise any hardware and/or software suitably configured to protect the CIS 115 components from users of other networks. Firewall 120 may reside in varying configurations including stateful inspection, proxy based and packet filtering, among others. Firewall 120 may be integrated as software within Internet server 125, any other system components, or may reside within another computing device or may take the form of a standalone hardware component.

Internet server 125 may be configured to transmit data to the mobile device 110 within markup language documents. As used herein, "data" may include encompassing information such as commands, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Like Internet server 125, application server 145 may communicate with any number of other servers, databases and/or components through any means known in the art. Further, application server 145 may serve as a conduit between the mobile device 110 and the various systems and components of the CIS 115. Internet server 125 may interface with application server 145 through any means known in the art including a LAN/WAN, for example. Application server 145 may further invoke software modules such as the CSE 147 in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In an embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second parties. Each of the three data sets in this example may contain different information that is stored using different data storage formats and/or techniques. Further, each data set may contain subsets of data that also may be distinct from other subsets.

As stated above, in various embodiments of system 100, the data can be stored without regard to a common format. However, in one embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate, for example, the identity of the issuer, user, transaction/membership account identifier, VID, TXA-ID or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The system 100 may be interconnected to an external data source 161 (for example, to obtain data from a vendor) via a second network, referred to as the external gateway 163. The external gateway 163 may include any hardware and/or software suitably configured to facilitate communications and/or process transactions between the system 100 and the external data source 161. Interconnection gateways are commercially available and known in the art. External gateway 163 may be implemented through commercially available hardware and/or software, through custom hardware and/or software components, or through a combination thereof. External gateway 163 may reside in a variety of configurations and may exist as a standalone system or may be a software component residing either inside IS 150, the external data source 161 or any other known configuration. External gateway 163 may be configured to deliver data directly to system 100 components (such as CSE 147) and to interact with other systems and components such as IS 150 databases. In one embodiment, the external gateway 163 may comprise web services that are invoked to exchange data between the various disclosed systems. The external gateway 163 represents existing proprietary networks that presently accommodate data exchange for data such as financial transactions, customer demographics, billing transactions and the like. The external gateway 163 is a closed network that is assumed to be secure from eavesdroppers.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C", by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Referring now to the figures, the block system diagrams and process flow diagrams represent mere embodiments of the invention and are not intended to limit the scope of the invention as described herein. For example, the steps recited in FIGS. 2-4 may be executed in any order and are not limited to the order presented. It will be appreciated that the following description makes appropriate references not only to the steps depicted in FIGS. 2-4, but also to the various system components as described above with reference to FIG. 1.

With reference to FIG. 1, in one embodiment, in response to user 105 logging on to an application, Internet server 125 may invoke an application server 145. Application server 145 invokes logic in the CSE 147 by passing parameters relating to the user's 105 requests for data. The CIS 115 manages requests for data from the CSE 147 and communicates with system 100 components. Transmissions between the user 105 and the Internet server 125 may pass through a firewall 120 to help ensure the integrity of the CIS 115 components. Practitioners will appreciate that the invention may incorporate any number of security schemes or none at all. In one embodiment, the Internet server 125 receives page requests from the mobile device 110 and interacts with various other system 100 components to perform tasks related to requests from the mobile device 110.

Internet server 125 may invoke an authentication server 130 to verify the identity of user 105 and assign specific access rights to user 105. In order to control access to the application server 145 or any other component of the CIS 115, Internet server 125 may invoke an authentication server 130 in response to user 105 submissions of authentication credentials received at Internet server 125. In response to a request to access system 100 being received from Internet server 125, Internet server 125 determines if authentication is required or desired, and transmits a prompt to the mobile device 110. User 105 enters authentication data at the mobile device 110, which transmits the authentication data to Internet server 125. Internet server 125 passes the authentication data to authentication server which queries the user database 140 for corresponding credentials. In response to user 105 being authenticated, user 105 may access various applications and their corresponding data sources.

Figure 2:
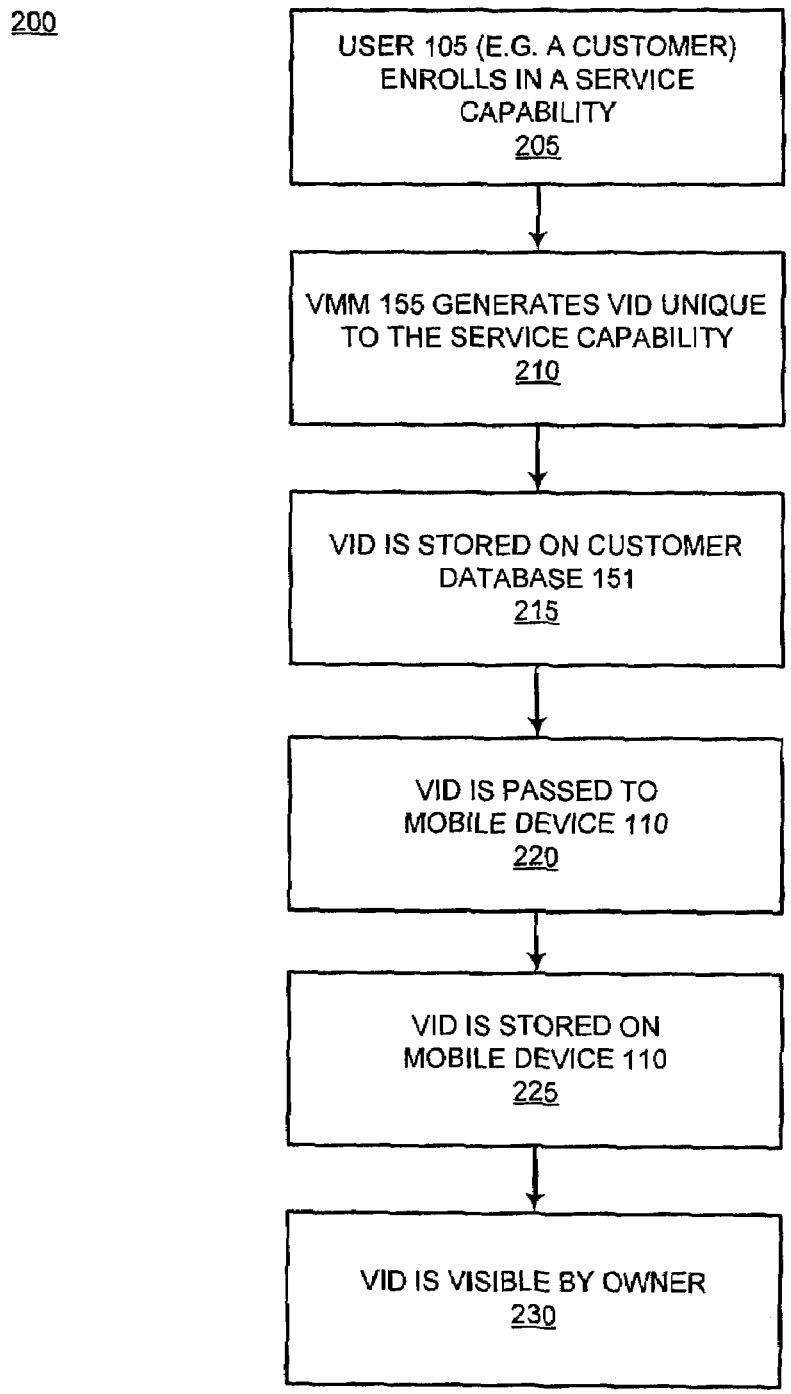
FIG. 2 is a representative process flow diagram for issuing a remote service identifier, in accordance with one embodiment of the present invention.

Referring now to FIG. 2, a representative process flow for issuing a remote service identifier is shown. User 105 enrolls in a service capability associated with a TXA (Step 205). For example, user 105 may enroll in a service capability that allows user 105 to use MEA 112, or other software on user 105's mobile device 110, to initiate and complete transactions using user's 105 TXA. In one embodiment, while the service associated with the VID enables transactions, the VID is not used by the service during the transaction process. Such a "non-transactable" VID allows the VID to provide access to the service for purposes of configuration, maintenance and tracking while also protecting the security of transactions. Thus, the VID may be stored and maintained under different rules and/or in different storage locations than the identifier that enables transactions.

Enabling a service capability may include configuring the parameters of MEA 112, installing a software module, upgrading a software module, exchanging security keys, etc. VMM 155 generates a VID (Step 210) and stores the VID on customer database 151 (Step 215). In one embodiment, the VID is unique to the TXA, the mobile device and the service capability. A VID is also helpful in identifying information useful during a customer service interaction. For example, the VID may link to a profile that stores the attributes (e.g. manufacturer, model number) of mobile device 110 or configuration information of software installed on mobile device (e.g. software vendor, version number, messaging protocol, etc.). In one embodiment, the VID is similar or identical in format to the TXA account number so that user 105, issuer and/or third parties recognize the VID as an identifier associated with the issuer. Hence, generating a VID may include similar steps and technologies as those associated with generating a TXA account number. However, a VID functions as an identifier and may not be associated with the ability to authorize or execute transactions against a TXA. In one embodiment, the VID meets TXA issuer fraud, compliance, privacy and legal guidelines for activities/functions of sharing/transmission, access, storage and display of a unique identifier. Referring again to FIG. 2, IS 150 passes the VID to mobile device 110 (Step 220). In one embodiment, the VID is passed to mobile device 110 via CIS 115, while the VID may be communicated to the mobile device via email, SMS message or other such messaging protocol or data transmission method. The VID is stored on mobile device 110 (Step 225) and is accessible and/or visible by user 105 (Step 230).

Figure 3:
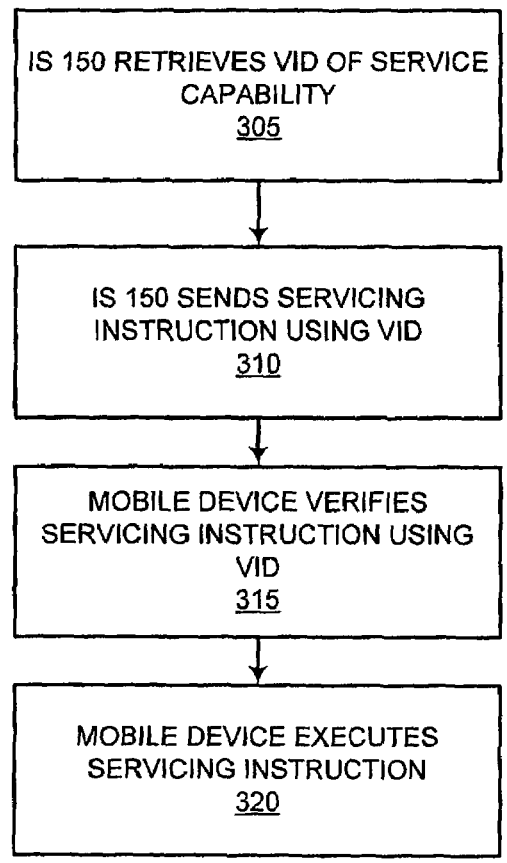
FIG. 3 is a representative process flow diagram for providing remote servicing functions, in accordance with one embodiment of the present invention.

FIG. 3 shows a representative process for providing remote servicing functions to user 105. In one embodiment, the VID allows user 105 to self-identify and authenticate with IS 150 without the use of another TXA form factor such as a plastic TXA card. The issuer retrieves the VID associated with the service capability to be serviced (Step 305). In one embodiment, the VID is stored in customer database 151. IS 150 sends servicing instructions using the VID (step 310). For instance, the issuer may desire to update the protocol for submitting authorizations for a loyalty account transaction. In one embodiment, the issuer has several other service capabilities installed on mobile device 110 (e.g. contactless financial transaction capability) and uses the VID associated specifically with the loyalty account service capability to provide maintenance instructions to mobile device 110. MEA 112 and service capability module 113 identify and verify the servicing instruction using the VID (Step 315) and executes the servicing instruction (Step 320). The servicing instruction may involve configuring the service, modifying the service, modifying parameters associated with the service, terminating the service, upgrading the service, modifying a service level associated with the service, installing software associated with the service, registering software associated with the service with the mobile device, registering software associated with the service with a third-party service provider, upgrading software associated with the service, or deleting software associated with the service. In one embodiment, multiple VIDs can be generated per TXA and/or per service capability. A VID may be used for a period of time and then set to expire according to a predetermined business rule, e.g. a VID can be set to expire on a certain date or expire after a certain number of customer service interactions occur. In one embodiment, when a VID expires, an alternate VID, which has already been stored on mobile device 110, automatically becomes activated. In an embodiment, user 105 receives a confirmation message on the display of mobile device 110 showing the VID and the service instruction that is to be executed.

Figure 4:
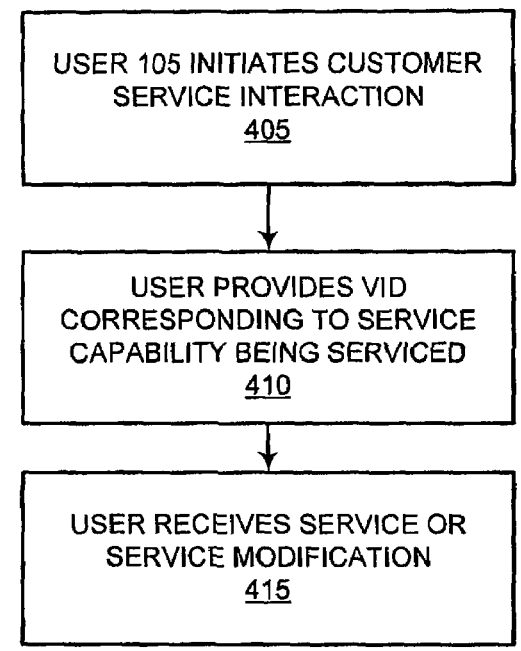
FIG. 4 is a representative process flow diagram for enabling remote customer interaction, in accordance with one embodiment of the present invention.

FIG. 4 shows a representative process flow diagram for enabling remote customer interaction. User 105 initiates a customer service interaction (Step 405). In one embodiment, user 105 initiates a customer service interaction using voice communications (e.g. calling a customer service number). The user 105 may make the customer service call using the device that has the service capability (i.e. mobile device 110) or may call customer service capability using a telecommunications device unassociated with the deice. In one embodiment, user 105 initiates the customer service capability over a non-voice (e.g. data) connection; for example, by clicking a help icon in MEA 112. Customer service may be delivered by automated customer service agent (e.g. software), by a human customer service agent or by a combination of automated means and human interaction. User 105 provides the VID corresponding to the customer service capability being serviced to the customer service agent (Step 410). In one embodiment, the VID ensures that user 105 is in possession of mobile device 110 and uses a second layer of authentication by prompting user 105 for something that they know. User 105 reads the visible, human readable VID from the display of mobile device 110. The customer service agent may prompt user 105 with additional verification and/or security questions (e.g. user 105 mother's maiden name, billing zip code or date of birth). User 105 receives the requested service or service modification from the customer service agent (Step 415).

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, when a phrase similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A method, comprising:
    creating, by a computer-based system for facilitating service identification, a visual identifier (VID) profile comprising a unique VID, a service identifier associated with a service and a mobile device identifier associated with a mobile device, wherein the service is associated with the mobile device, wherein the VID profile is stored in a VID database, and wherein the VID is unique to the mobile device and the service;
    transmitting, by the computer-based system, the unique VID to the mobile device, wherein the mobile device stores the VID and displays the VID; and,
    communicating, by the computer-based system, with the mobile device based upon the unique VID.

2. The method of claim 1, wherein the communicating with the mobile device based upon the unique VID comprises facilitating maintenance associated with the service on the mobile device.

3. The method of claim 2, wherein the facilitating maintenance comprises facilitating at least one of: configuring the service, modifying the service, modifying parameters associated with the service, blocking the service, reinstating the service, terminating the service, upgrading the service, modifying a service level associated with the service, installing software associated with the service, registering software associated with the service with the mobile device, registering software associated with the service with a third-party service provider, upgrading software associated with the service, or deleting software associated with the service.

4. The method of claim 2, further comprising retrieving the VID profile associated with the service from the VID database.

5. The method of claim 1, wherein the communicating with the mobile device based upon the unique VID comprises:
    receiving a customer service request;
    receiving the unique VID;
    retrieving the VID profile; and,
    providing VID profile data responsive to a customer service request.

6. The method of claim 5, wherein the receiving the customer service request comprises receiving the unique VID.

7. The method of claim 5, wherein at least one of the customer service request and the unique VID are received via at least one of voice communication, data communication or communication enabled by the mobile device.

8. The method of claim 5, wherein the providing VID profile data comprises providing VID profile data to a customer service agent in communication with the mobile device.

9. The method of claim 8, wherein the customer service agent is at least one of a human being or a computer.

10. The method of claim 5, wherein the receiving the customer service request comprises receiving a request to at least one of: enroll in an additional service, modify the service, block the service, activate the service, reinstate the service, terminate the service, upgrade the service, install a service capability module associated with the service, activate a service capability module associated with the service, delete a service capability module associated with the service, or modify a service capability module associated with the service.

11. The method of claim 5, wherein the unique VID is read by a user from a display on the mobile device.

12. The method of claim 1, wherein the service is associated with a transaction account, and wherein the mobile device is configured to initiate financial transactions using the transaction account.

13. The method of claim 12, wherein the service does not use the unique VID.

14. The method of claim 12, wherein the unique VID is non-transactable.

15. The method of claim 1, wherein the VID profile further comprises a transaction account number.

16. The method of claim 1, wherein the unique VID is in the format of at least one of: human readable, alpha-numeric or graphical.

17. The method of claim 1, wherein the unique VID is the same size and format as a transaction account number associated with the unique VID.

18. The method of claim 1, further comprising generating the unique VID.

19. The method of claim 18, wherein the unique VID expires responsive to at least one of an expiration date or a predetermined number of customer service interactions.

20. The method of claim 1, wherein the unique VID is used to at least one of track usage of a third-party service and produce usage data and wherein the usage data is used to settle at least one of payment or bounties between the third-party service provider and a transaction account issuer associated with the unique VID.

21. A method, comprising:
    receiving, on a mobile device from a service provider, a unique visual identifier (VID) associated with a service enabled on the mobile device, wherein the VID is associated with a visual identifier (VID) profile comprising the unique VID, a service identifier associated with the service and a mobile device identifier associated with the mobile device, wherein the VID is unique to the mobile device and the service, wherein the VID profile is stored in a VID database accessible by the service provider; and,
    receiving, on the mobile device, a communication based upon the unique VID.

22. A unique visual identifier (VID) stored on a mobile device, wherein the unique VID is configured to facilitate communicating with a service provider based upon the unique VID, wherein the service provider accesses the unique VID via a VID profile stored on a VID database, wherein the VID profile comprises the unique VID, a service identifier associated with a service provided by the service provider and enabled on the mobile device, and a mobile device identifier associated with the mobile device, wherein the VID is unique to the mobile device and the service.

23. An article of manufacture including a computer-readable medium having computer-executable instructions stored thereon that, in response to execution by a computer for facilitating service identification, causes the computer to perform operations, comprising:

creating, by the computer, a visual identifier (VID) profile comprising a unique VID, a service identifier associated with a service and a mobile device identifier associated with a mobile device, wherein the service is associated with the mobile device, wherein the VID profile is stored in a VID database, wherein the VID is unique to the mobile device and the service;

transmitting, by the computer, the unique VID to the mobile device, wherein the mobile device stores the unique VID and displays the unique VID; and, communicating, by the computer, with the mobile device based upon the unique VID.

* * * * *